(12) United States Patent
Cho et al.

(10) Patent No.: US 8,264,651 B2
(45) Date of Patent: Sep. 11, 2012

(54) THIN FILM TRANSISTOR ARRAY SUBSTRATE AND LIQUID CRYSTAL DISPLAY PANEL HAVING THE SAME

(75) Inventors: Seon-Ah Cho, Busan (KR); Ji-Won Sohn, Seoul (KR); Hee-Wook Do, Chungcheongnam-do (KR); Jun-Hee Na, Chungcheongnam-do (KR)

(73) Assignee: Samsung Electronics Co., Ltd. (KR)

( * ) Notice: Subject to any disclaimer, the term of this patent is extended or adjusted under 35 U.S.C. 154(b) by 1038 days.

(21) Appl. No.: 12/182,854

(22) Filed: Jul. 30, 2008

(65) Prior Publication Data

US 2009/0046233 A1   Feb. 19, 2009

(30) Foreign Application Priority Data

Aug. 14, 2007   (KR) .................. 10-2007-0081818

(51) Int. Cl.
 *G02F 1/1343* (2006.01)
(52) U.S. Cl. ........................................ 349/141
(58) Field of Classification Search .................. None
 See application file for complete search history.

(56) References Cited

U.S. PATENT DOCUMENTS

| 6,525,798 B1 * | 2/2003 | Yamakita et al. ............. 349/141 |
| 2001/0001568 A1 * | 5/2001 | Hiroshi .......................... 349/143 |
| 2002/0113931 A1 * | 8/2002 | Park et al. ...................... 349/141 |
| 2003/0071952 A1 * | 4/2003 | Yoshida et al. ................ 349/141 |
| 2005/0094077 A1 * | 5/2005 | Baek .............................. 349/141 |

FOREIGN PATENT DOCUMENTS

| JP | 2002-126328 | 4/2002 |
| JP | 2002-135423 | 5/2002 |
| JP | 2005-001356 | 1/2005 |

OTHER PUBLICATIONS

English Abstract, Publication No. JP 2002-135423.
English Abstract, Publication No. JP 2005-001356.
English Abstract, Publication No. JP 2002-126328.

* cited by examiner

*Primary Examiner* — Lucy Chien
(74) *Attorney, Agent, or Firm* — Innovation Counsel LLP

(57) ABSTRACT

A TFT array is disclosed that includes a substrate, a gate line formed on the substrate, the gate line extending in a first direction; a data line insulated from the gate line, the data line extending in a second direction different from the first direction and crossing the gate line; and a pixel, positioned adjacent an intersection of the gate line and the data line, wherein the pixel comprises a first pixel electrode portion comprising a plurality of spaced apart first electrode lines, the first pixel electrode portion having an associated TFT coupled to the first pixel electrode portion, a second pixel electrode portion comprising a plurality of spaced apart second electrode lines, the second pixel electrode portion capacitively coupled with the first pixel electrode portion, wherein a width of each of the first electrode lines of the first pixel electrode portion is narrower than a width of each of the second electrode lines of the second pixel electrode portion, and an interval between adjacent first electrode lines of the first pixel electrode portion is smaller than an interval between adjacent second electrode lines of the second pixel electrode portion.

29 Claims, 7 Drawing Sheets

THIN FILM TRANSISTOR ARRAY SUBSTRATE AND LIQUID CRYSTAL DISPLAY PANEL HAVING THE SAME

CROSS-REFERENCE TO RELATED APPLICATION

This application claims priority to and the benefit of Korean Patent Application No. 10-2007-0081818, filed in the Korean Intellectual Property Office on Aug. 14, 2007, the disclosure of which is incorporated herein by reference in its entirety.

BACKGROUND OF THE INVENTION

1. Field of the Invention

The present invention relates to a TFT array substrate and a liquid crystal display panel having the same.

2. Description of the Related Art

Liquid crystal displays ("LCDs") display images by adjusting the light transmittances of liquid crystal cells arranged on an LCD panel in a matrix form according to video signals. Wide-viewing angle technology is applied to LCDs in order to overcome image distortion.

To obtain a wide viewing angle, the LCDs may employ a multi-domain vertical alignment ("MVA") mode, a patterned ITO VA ("PVA") mode, a superpatterned ITO VA ("S-PVA") mode, and a micro-slit VA mode depending on a domain formation process. In the VA mode, liquid crystal molecules, which have a negative dielectric anisotropy, are arranged and driven perpendicular to the direction of an electric field to adjust the light transmittance.

The PVA mode, which is a VA mode using a slit pattern, forms a multi-domain structure by forming slits, which create fringe electric fields, on a common electrode and pixel electrodes of an upper substrate and a lower substrate, respectively, which then causes the liquid crystal molecules to be driven symmetrically with respect to the slits using the fringe electric fields.

The PVA mode, which further includes a common electrode patterning process in contrast to the other modes, exhibits a weakness against static electricity and also displays a poor distribution of optical characteristics due to the misalignment between the upper substrate and lower substrate. The above problems become increasingly serious as the size of the LCD increases.

The patternless VA mode does not provide slits on the common electrode of the upper substrate. The patternless VA mode does not include the step of patterning the common electrode on the upper substrate, and therefore, slits are provided only on the pixel electrodes of the lower substrate to drive the liquid crystal molecules.

Recently, the S-PVA mode has been intensively studied as an approach to further improve the visibility of LCDs. The S-PVA mode, which is classified into a TT-SPVA mode and a CC-SPVA mode, improves visibility by dividing a pixel into a main portion and a sub-portion and making one portion different from the other in brightness. However, the TT-SPVA mode is disadvantageous for having a reduced aperture ratio because more than two TFTs are required. Moreover, the overall response time in the TT-SPVA mode is slow since lower voltages are applied to the sub portion.

SUMMARY OF THE INVENTION

The present invention provides a TFT array substrate, which employs an S-PVA mode to have excellent visibility, an improved aperture ratio, simplified manufacturing processes, reduced costs, and an LCD panel, the TFT array substrate.

One exemplary embodiment of the present invention provides a thin film transistor array comprising: a substrate, a gate line formed on a the substrate, the gate line extending in a first direction; a data line insulated from the gate line, the data line extending in a second direction different from the first direction and crossing the gate line; a pixel positioned adjacent an intersection of the gate line and the data line, wherein the pixel comprises, a first pixel electrode portion comprising a plurality of spaced apart first electrode lines, the first pixel electrode portion having an associated TFT coupled to the first electrode portion, a second pixel electrode portion comprising a plurality of spaced apart second electrode lines, the second pixel electrode portion capacitively coupled with the first pixel electrode portion, wherein a width of each of the first electrode lines of the first pixel electrode portion is narrower than a width of each of the second electrode lines of the second pixel electrode portion, and an interval between adjacent first electrode lines of the first pixel electrode portion is smaller than an interval between adjacent second electrode lines of the second pixel electrode portion.

Another exemplary embodiment of the present invention provides a liquid crystal display panel comprising: a thin film transistor array substrate; a color filter array substrate facing the thin film transistor array substrate, the color filter array substrate comprising a first substrate, a color filter array formed on the first substrate, and a common electrode deposited on the entire surface of the color filter array; and a liquid crystal layer interposed between the thin film transistor array substrate and the color filter array substrate, wherein the thin film transistor array substrate comprises: a second substrate; a gate line formed on the second substrate, the gate line extending in a first direction; a data line insulated from the gate line, the data line extending in a second direction different from the first direction and crossing the gate line; and a pixel positioned adjacent an intersection of the gate line and the data line, wherein the pixel comprises: a first pixel electrode portion comprising a plurality of spaced apart first electrode lines, the first pixel electrode portion having an associated TFT coupled to the first electrode portion; a second pixel electrode portion comprising a plurality of spaced apart second electrode lines, the second pixel electrode portion capacitively coupled with the first pixel electrode portion; wherein a width of each of the first electrode lines of the first pixel electrode portion is narrower than a width of each of the second electrode lines of the second pixel electrode portion, and an interval between adjacent first electrode lines of the first pixel electrode portion is smaller than an interval between adjacent second electrode lines of the second pixel electrode portion.

The first and second pixel electrode portions may be separated by a space formed in parallel with the gate line.

The first and second pixel electrode portions each comprise four domains and further wherein the four domains of the first pixel electrode portion are associated with the first storage electrode portion and the four domains of the second pixel electrode portion are associated with the second storage electrode portion.

The width of each of the electrode lines of the first pixel electrode portion and the second pixel electrode portion may be less than about 5 µm.

The interval between the electrode lines of the first pixel electrode portion and the second pixel electrode portion may be less than about 5 µm.

A ratio of the interval between the electrode lines to the width of the electrode line for each of the first pixel electrode portion and the second pixel electrode portion is in the range of about from 0.5:1 to 2:1.

An area of the second pixel electrode portion may be larger than an area of the first pixel electrode portion.

Molecules in the liquid crystal layer may be vertically aligned.

BRIEF DESCRIPTION OF THE DRAWINGS

The above and other features of the present invention will be described in reference to certain exemplary embodiments thereof with reference to the attached drawings in which.

DETAILED DESCRIPTION

Reference is made in detail to embodiments of the present invention, examples of which are illustrated in the accompanying drawings.

Hereinafter, embodiments of the present invention are described with reference to the accompanying drawings.

Figure 1:
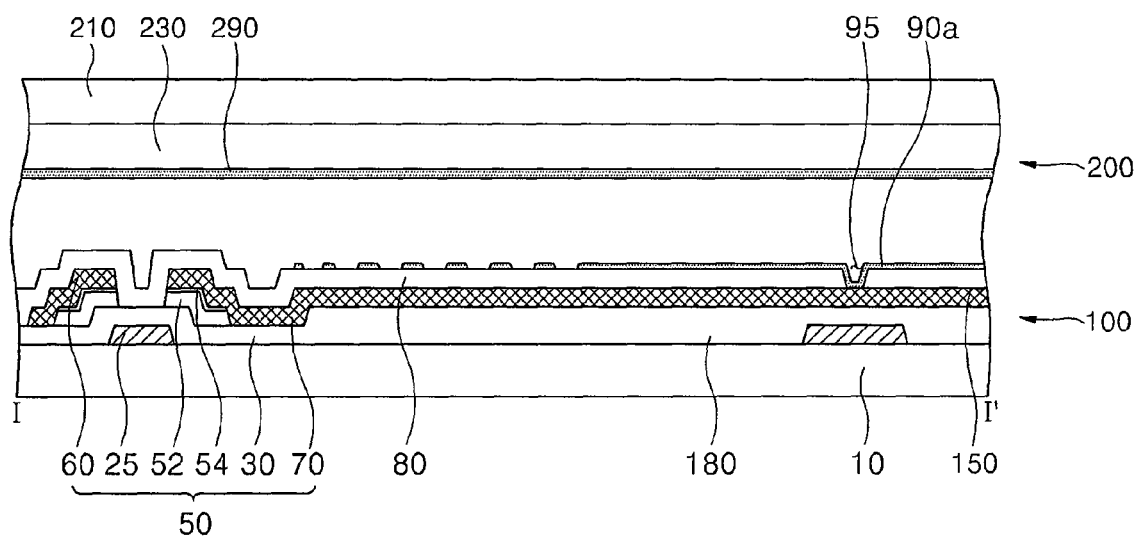
FIG. 1 is a cross sectional view of an LCD panel taken along line I-I' of FIG. 2 according to an exemplary embodiment of the present invention.
Figure 2:
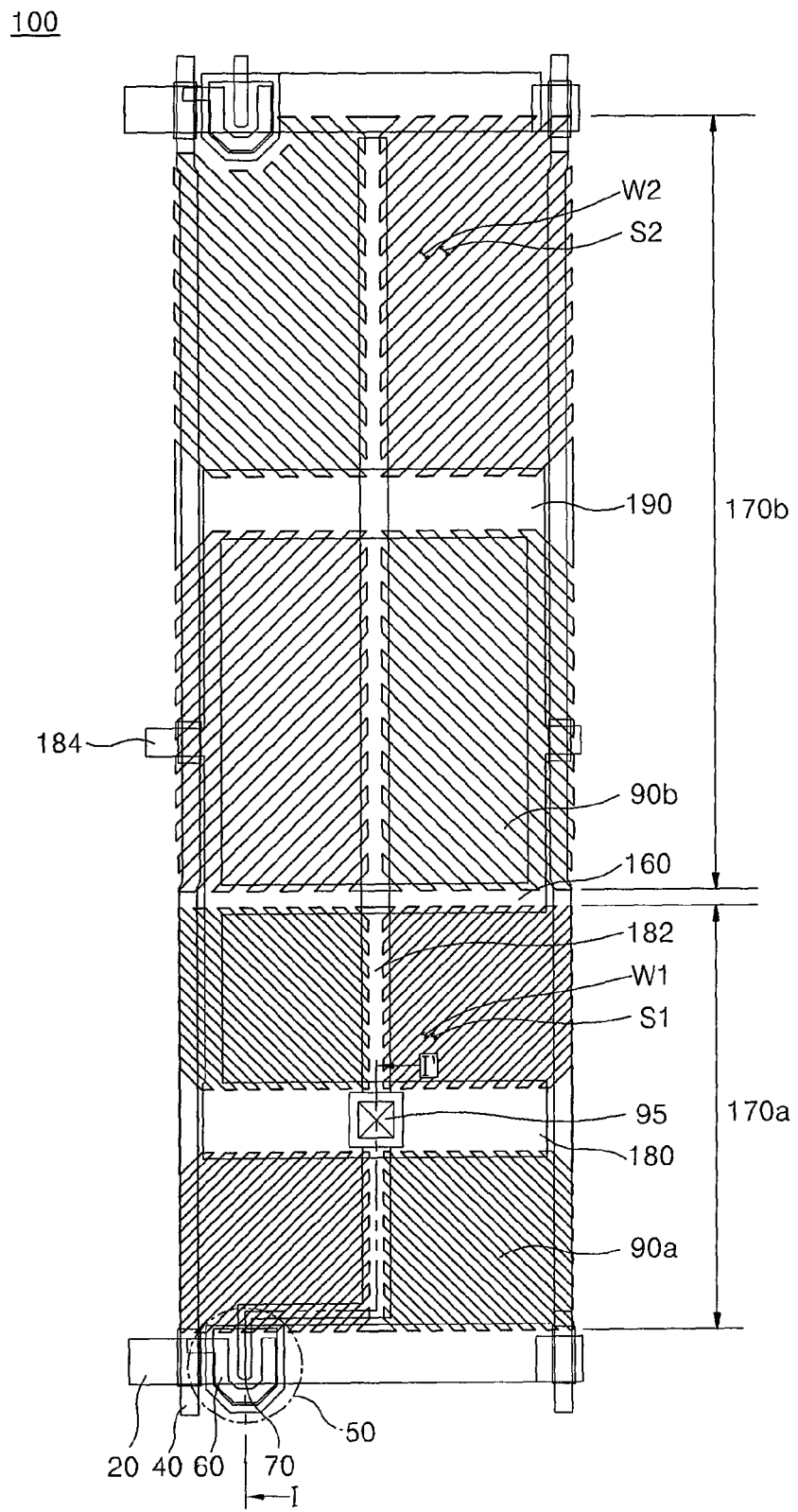
FIG. 2 is a plan view of a thin film transistor array substrate for an LCD panel according to an exemplary embodiment of the present invention.

FIG. 1 is a cross sectional view of an LCD panel taken along line I-I' of FIG. 2 according to an exemplary embodiment of the present invention.

Referring to FIG. 1, the LCD panel includes a thin film transistor ("TFT") array substrate 100, a color filter array substrate 200, and a liquid crystal layer 150.

Images are displayed by adjusting the transmittance of light while the molecules of the liquid crystal layer 150 are arranged by fringe electric fields occurring between an electrode line 90 of the TFT array substrate 100 and a common electrode 290 of the color filter array substrate 200.

The color filter array substrate 200 has a color filter 230 and a common electrode 290 formed on a first base substrate 210. The common electrode 290 is applied uniformly on the entire surface of the color filter 230 without being patterned.

FIG. 2 is a plan view of a TFT array substrate for an LCD panel according to an exemplary embodiment of the present invention.

Referring to FIG. 2, the TFT array substrate 100 includes a second base substrate 10, a gate line 20, a data line 40, and a pixel formed on the second base substrate 10. The gate line 20 crosses the data line 40. The pixel includes a TFT 50, a first pixel electrode portion 170a, and a second pixel electrode portion 170b.

The gate line 20 supplies a scan signal to the TFT 50 and the data line 40 supplies an image data signal to the TFT 50. The gate line 20 and the data line 40 cross each other on the substrate 10 with a gate insulation film 30 disposed therebetween. The TFT 50 is connected to the gate line 20 and the data line 40, and the first and second pixel electrode portions 170a and 170b are coupled to the TFT 50.

The structure of the TFT 50 is described below in detail with reference to FIG. 1.

The TFT 50 supplies an image data signal from the data line 40 to the first and second pixel electrode portions 170a and 170b in response to a scan signal supplied from the gate line 20. For this purpose, the TFT 50 includes a gate electrode 25, a source electrode 60, a drain electrode 70, a semiconductor layer 52, and an ohmic contact layer 54.

The gate electrode 25 is connected to the gate line 20, and the source electrode 60 is connected to the data line 40. The drain electrode 70 is connected to the first pixel electrode portion 170a via a contact hole 95 and extends up to the second pixel electrode portion 170b. The semiconductor layer 52 is formed between the drain electrode 70 and the gate electrode 25 and overlaps the gate insulation film 30, thereby forming a channel between the source electrode 60 and the drain electrode 70. A passivation layer 80 is deposited on the entire surface of the source electrode 60 and the drain electrode 70 to protect the TFT 50.

Returning to FIG. 2, the first and second pixel electrode portions 170a and 170b of each pixel have a plurality of slit-shaped electrode lines 90a and 90b, respectively. The pixel is separated into the two pixel electrode portions, and therefore, a difference in brightness may occur in the same pixel by adjusting the transmittance between the two portions, which in turn may improve the visibility of the LCD panel.

The pixel includes the first pixel electrode portion 170a, the second pixel electrode portion 170b, and a storage electrode having first and second storage electrode portions 180 and 190. The first pixel electrode portion 170a is formed to have a plurality of slit-shaped electrode lines 90a, each of which is connected to the TFT 50. The second pixel electrode portion 170b is formed to have a plurality of slit-shaped electrode lines 90b and the second pixel electrode portion 170b is capacitively coupled with the first pixel electrode portion 170a. The first and second storage electrode portions 180 and 190 form storage capacitors Cst1 and Cst2 along with the first and second pixel electrode portions 170a and 170b, respectively.

Pixel electrode voltages of the first and second pixel electrode portions 170a and 170b are maintained by the first and second storage capacitors Cst1 and Cst2, respectively. The first and second storage capacitors Cst1 and Cst2 are formed by overlapping the first and second storage electrode portions 180 and 190 extending from the storage line 184 on the electrode lines 90a and 90b, respectively, with an insulating layer between the storage electrode portion 180 and the electrode line 90a and between the storage electrode portion 190 and the electrode line 90b, respectively. More specifically, the first storage capacitor Cst1 is formed in the first pixel electrode portion 170a by overlapping the first storage electrode portion 180, which is formed in parallel with the gate line 20, on the electrode line 90a, with an insulating layer interposed between the electrode line 90a and the first storage electrode portion 180. The second storage capacitor Cst2 is formed in the second pixel electrode portion 170b by overlapping the second storage electrode portion 190, which is formed in parallel with the gate line 20, on the electrode line 90b, with an insulating layer interposed between the electrode line 90b and the second storage electrode portion 190.

The pixel further includes a coupling electrode 182 that transfers to the second pixel electrode portion 170b the data voltage stored at the first pixel electrode portion 170a. The coupling electrode 182 may be formed perpendicular to the first and second storage electrode portions 180 and 190. Each electrode line 90a of the first pixel electrode portion 170a and each electrode line 90b of the second pixel electrode portion 170b form a coupling capacitor Ccp together with the coupling electrode 182. Therefore, the voltage applied to the second pixel electrode portion 170b is lower than the voltage applied to the first pixel electrode portion 170a. In other words, two areas, which have different voltages, exist in the same pixel, thus making it possible to improve the visibility of the LCD panel.

The width W1 of each electrode line 90a is formed narrower than the width W2 of each electrode line 90b, and the interval S1, or space, between adjacent edges of each of the electrode lines 90a is formed narrower than the interval S2 between adjacent edges of each of the electrode lines 90b. The interval between the electrode lines is the distance between adjacent edges of the electrode lines. By doing so, the transmittances of the first and second pixel electrode portions 170a and 170b may be different from each other.

In the prior art, which employs a coupling capacitor Ccp, the width W and interval S are not different with respect to the electrode lines 90a and 90b. The present invention, however, has a different width W and interval S in the electrode lines 90a and 90b, thus raising a difference in voltage between the pixel electrode portions 170a and 170b.

Figure 3:
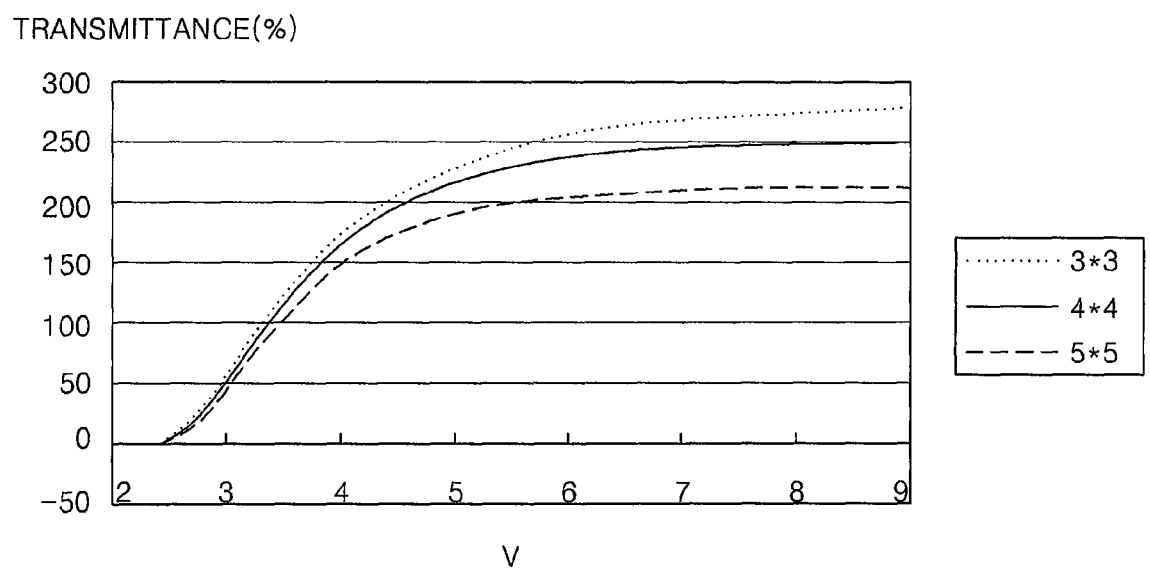
FIG. 3 is a graph showing a change in transmittance depending on the width of an electrode line and the interval between electrode lines.

FIG. 3 is a graph showing a change in transmittance depending on the width of an electrode line and the interval between electrode lines. In FIG. 3, three combinations of a width (W) and an interval (S), "W*S", such as 3*3, 4*4, and 5*5, were used to measure a change in transmittance, wherein units of the width and interval are given in micrometers. The gap between cells in this LCD panel was 3.5 μm.

As shown in FIG. 3, the transmittance gradually increases as the width W and interval S decrease. Accordingly, a difference between the transmittances occurs in the same pixel area by making the width W and interval S different, which causes a difference in brightness, thereby leading to improvement in invisibility of the LCD panel.

The width W and interval S may be formed narrower than 5 μm when taking into consideration the brightness and liquid crystal control ability, but their dimensions are not limited thereto.

The ratio (S/W) of the width W and interval S may be in the range from 0.5:1 to 2:1, but is not limited thereto.

The adjacent edges of the first pixel electrode portion 170a and the second pixel electrode portion 170b are separated by a space 160 formed along an axis which is parallel with an axis of the gate line 20, as shown in FIG. 2. The first pixel electrode portion 170a and the second pixel electrode portion 170b may be differentiated in various ways without impairing the effect of the invention. The first pixel electrode portion 170a is defined as an area where the width WI and interval S1 of the electrode lines 90a are formed narrower than the width W2 and interval S2 of the electrode lines 90b defined by the second pixel electrode portion 170b, and the first pixel electrode portion 170a generally serves as a high-brightness area. Therefore, the first pixel electrode portion 170a may be formed smaller in area than the second pixel electrode portion 170b.

The first pixel electrode portion 170a and the second pixel electrode portion 170b, respectively, may be uniformly divided into four domains with respect to the intersection of the first storage electrode portion 180 and the drain electrode 70 in the first pixel electrode portion 170a and the intersection of the second storage electrode portion 190 and the drain electrode 70 in the second pixel electrode portion 170b.

The LCD panel including the TFT array substrate according to exemplary embodiments of the present invention applies the same voltages to the first and second pixel electrode portions 170a and 170b, through a single TFT, and therefore, the reduction in response speed, a structural problem of existing LCD panels, may be prevented.

Figure 4A:
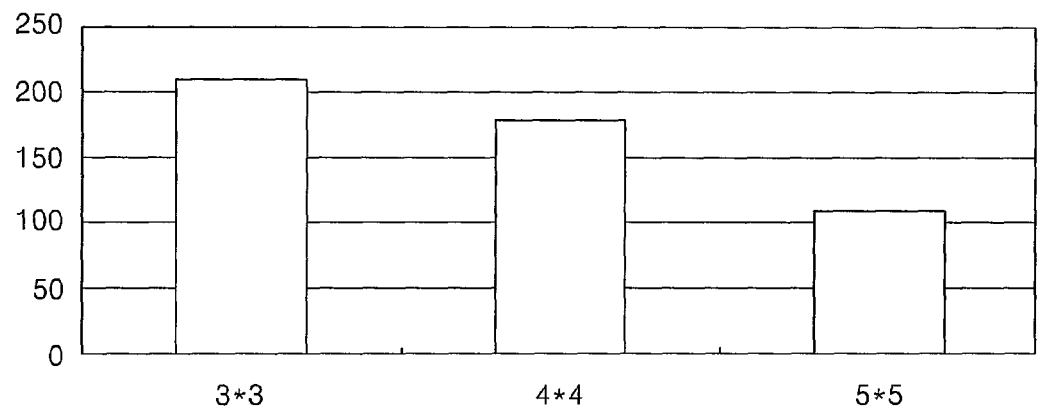
FIGS. 4A and 4B are graphs illustrating response speeds and response waveforms depending on the width of an electrode line and the interval between electrode lines.
Figure 4B:
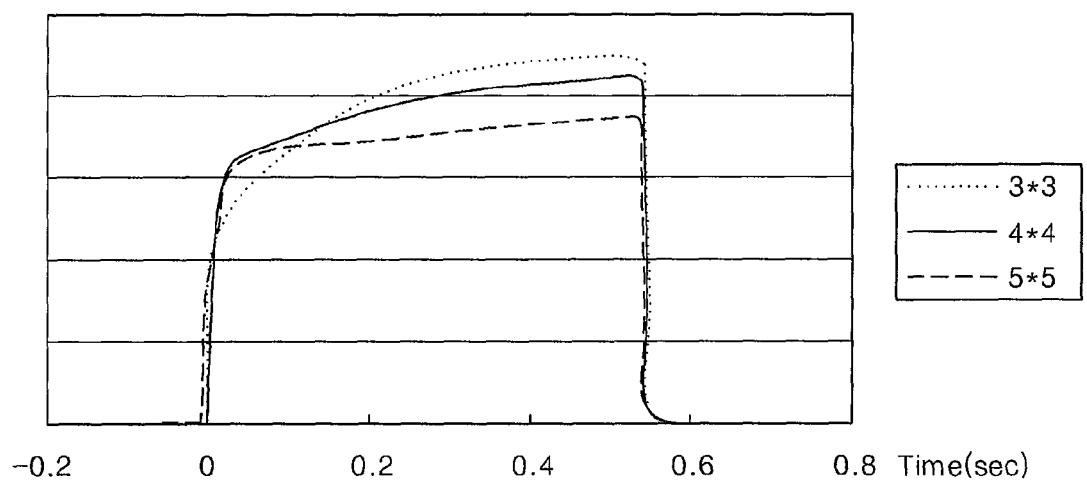

FIGS. 4A and 4B are graphs illustrating response speed and response waveforms according to the width of an electrode line and the interval between the electrode lines.

In FIGS. 4A and 4B, the response speed and response waveforms of the LCD panel are measured and analyzed in a case where width*interval (W*S) is 3*3, 4*4, and 5*5, respectively. The gap between cells in this LCD panel was 3.5 μm. FIGS. 4A and 4B show that the response speed was improved and that the waveforms were stabilized as the width W and interval S increase. Therefore, the width W and interval S should be adjusted not to be excessively small.

Figure 5A:
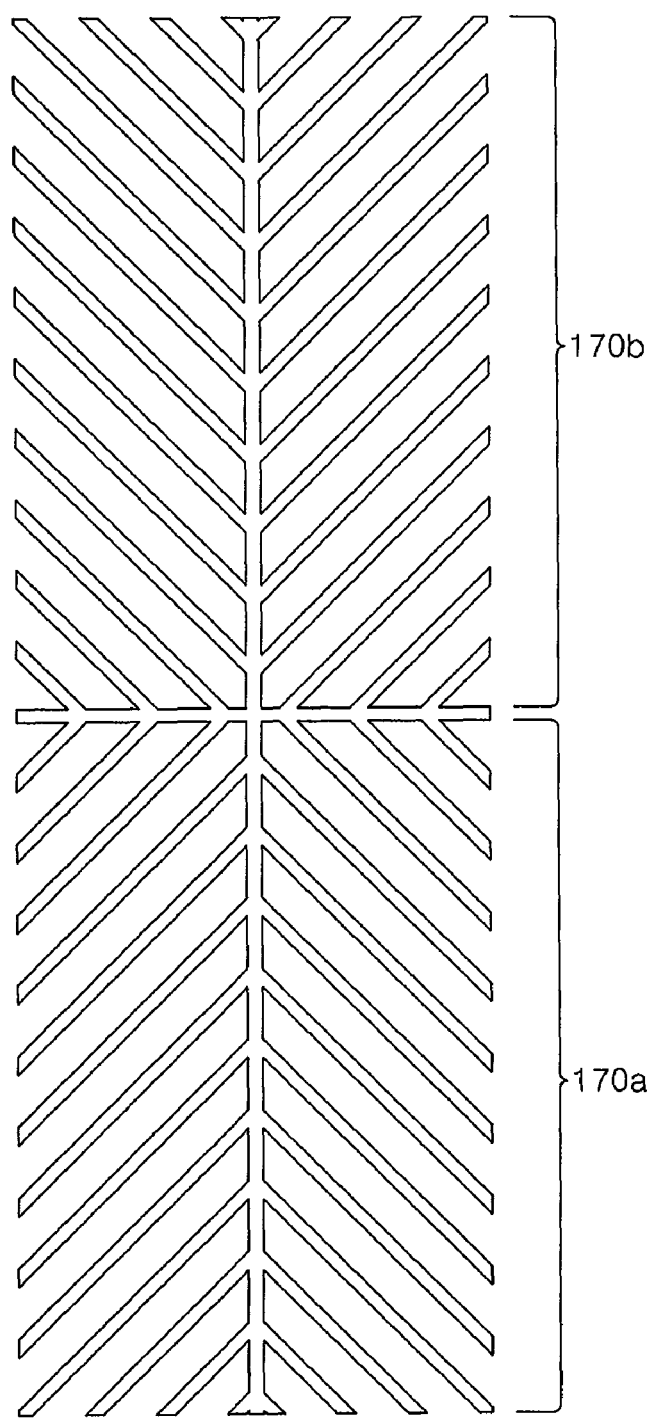
FIGS. 5A, 5B, and 5C are views schematically illustrating a shape of a pixel electrode applicable to the present invention.
Figure 5B:
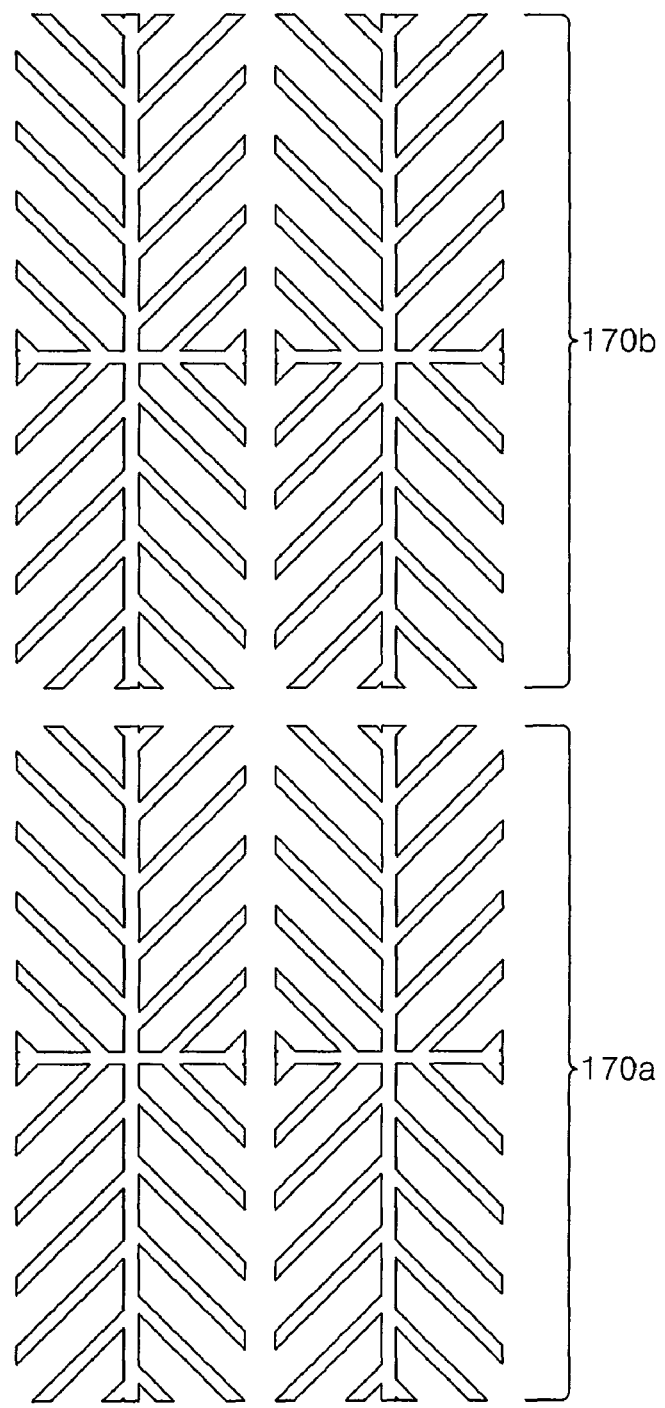
Figure 5C:
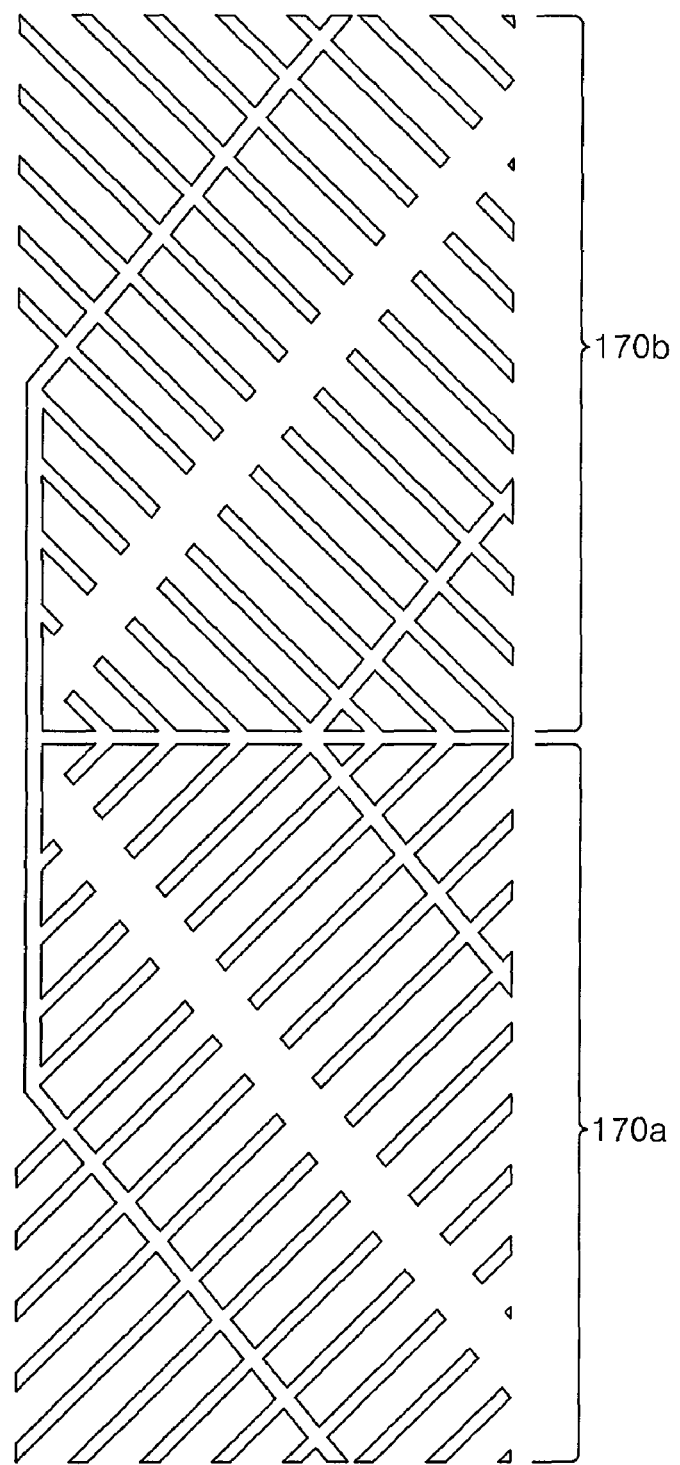

FIGS. 5A, 5B, and 5C are views schematically illustrating a shape of a pixel electrode applicable to the present invention.

The pixel electrode area is divided into the first pixel electrode portion and the second pixel electrode portion, each of which is separated into four domains. The first pixel electrode portion may be divided into four domains by the first storage electrode portion and the drain electrode, and the second pixel electrode portion may be divided into four domains by the second storage electrode portion and the drain electrode. In addition, each pixel electrode portion has electrode lines, and each of the electrode lines are arranged towards the intersection of a storage electrode portion and a drain electrode in a respective pixel electrode portion. However, the present invention is not limited thereto, but may be implemented in various forms. For example, each of the pixel electrode portions 170a and 170b may be divided into two domains as shown in FIG. 5A or eight domains as shown in FIG. 5B, or may be shaped as a chevron pattern as shown in FIG. 5C.

As mentioned above, the exemplary embodiments of the present invention may provide excellent visibility of a LCD panel or a TFT array substrate, even with a single TFT, simplify their structures and processes, and reduce the costs by dividing a pixel area into a plurality of domains to cause a brightness difference.

Moreover, the exemplary embodiments of the present invention may increase the voltage difference between two pixel electrode portions by making the width and interval of each electrode line different.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A thin film transistor array comprising:
a substrate;
a gate line formed on the substrate, the gate line extending in a first direction;
a data line insulated from the gate line, the data line extending in a second direction different from the first direction and crossing the gate line; and
a pixel, wherein the pixel comprises
a first pixel electrode portion comprising a plurality of spaced apart first electrode lines, the first pixel electrode portion having an associated TFT coupled to the first electrode lines, and a second pixel electrode portion comprising a plurality of spaced apart second electrode lines, the second pixel electrode portion capacitively coupled with the first pixel electrode portion;

wherein a width of each of the first electrode lines of the first pixel electrode portion is narrower than a width of each of the second electrode lines of the second pixel electrode portion, and an interval between adjacent first electrode lines of the first pixel electrode portion is smaller than an interval between adjacent second electrode lines of the second pixel electrode portion.

2. The thin film transistor array of claim 1, wherein the pixel further comprises a storage electrode having first and second storage electrode portions, wherein the first and second storage electrode portions form first and second storage capacitors respectively with the first and second pixel electrode portions.

3. The thin film transistor array of claim 1, wherein an edge of the first pixel electrode portion is spaced apart from an edge of the second pixel electrode portion along an axis which is parallel with the first direction.

4. The thin film transistor array of claim 2, wherein the first and second pixel electrode portions each comprise four domains and further wherein the four domains of the first pixel electrode portion are associated with the first storage electrode portion and the four domains of the second pixel electrode portion are associated with the second storage electrode portion.

5. The thin film transistor array of claim 1, wherein the width of each of the electrode lines of the first pixel electrode portion and the second pixel electrode portion is less than about 5 μm.

6. The thin film transistor array of claim 1, wherein the interval between the electrode lines of the first pixel electrode portion and the second pixel electrode portion is less than about 5 μm.

7. The thin film transistor array of claim 1, wherein a ratio of the interval between the electrode lines to the width of the electrode lines for each of the first pixel electrode portion and the second pixel electrode portion is in the range of about from 0.5:1 to 2:1.

8. The thin film transistor array of claim 1, wherein an area of the second pixel electrode portion is larger than an area of the first pixel electrode portion.

9. A liquid crystal display panel comprising:
a thin film transistor array substrate;
a color filter array substrate facing the thin film transistor array substrate, the color filter array substrate comprising a first substrate, a color filter array formed on the first substrate, and a common electrode on the entire surface of the color filter array; and
a liquid crystal layer interposed between the thin film transistor array substrate and the color filter array substrate,
wherein the thin film transistor array substrate comprises:
a second substrate; a gate line formed on the second substrate, the gate line extending in a first direction; a data line insulated from the gate line, the data line extending in a second direction different from the first direction and crossing the gate line; and a pixel,
wherein the pixel comprises
a first pixel electrode portion comprising a plurality of spaced apart first electrode lines, the first pixel electrode portion having an associated TFT coupled to the first electrode lines; and
a second pixel electrode portion comprising a plurality of spaced apart second electrode lines, the second pixel electrode portion capacitively coupled with the first pixel electrode portion;

wherein a width of each of the first electrode lines of the first pixel electrode portion is narrower than a width of each of the second electrode lines of the second pixel electrode portion, and an interval between adjacent first electrode lines of the first pixel electrode portion is smaller than an interval between adjacent second electrode lines of the second pixel electrode portion.

10. The liquid crystal display panel of claim 9, wherein the pixel further comprises a storage electrode having first and second storage electrode portions, wherein the first and second storage electrode portions form first and second storage capacitors respectively with the first and second pixel electrode portions.

11. The liquid crystal display panel of claim 9, wherein an edge of the first pixel electrode portion is spaced apart from an edge of the second pixel electrode portion along an axis which is parallel with the first direction.

12. The liquid crystal display panel of claim 9, wherein the first and second pixel electrode portions each comprise four domains and further wherein the four domains of the first pixel electrode portion are associated with the first storage electrode portion and the four domains of the second pixel electrode portion are associated with the second storage electrode portion.

13. The liquid crystal display panel of claim 9, wherein the width of each of the electrode lines of the first pixel electrode portion and the second pixel electrode portion is less than about 5 μm.

14. The liquid crystal display panel of claim 9, wherein the interval between the electrode lines of the first pixel electrode portion and the second pixel electrode portion is less than about 5 μm.

15. The liquid crystal display panel of claim 9, wherein a ratio of of the interval between the electrode lines to the width of the electrode lines for each of the first pixel electrode portion and the second pixel electrode portion is in the range of about from 0.5:1 to 2:1.

16. The liquid crystal display panel of claim 9, wherein an area of the second pixel electrode portion is larger than an area of the first pixel electrode portion.

17. The liquid crystal display panel of claim 9, wherein molecules in the liquid crystal layer are vertically aligned.

18. A liquid crystal display panel comprising:
a thin film transistor array substrate;
a color filter array substrate facing the thin film transistor array substrate, the color filter array substrate comprising a first substrate, a color filter array on the first substrate, and a common electrode on the entire surface of the color filter array; and
a liquid crystal layer interposed between the thin film transistor array substrate and the color filter array substrate,
wherein the thin film transistor array substrate comprises:
a second substrate;
a gate line on the second substrate, the gate line extending in a first direction;
a data line insulated from the gate line, the data line extending in a second direction different from the first direction and crossing the gate line; and
a pixel coupled to the gate line and the data line,
wherein the pixel comprises:
a first pixel electrode portion comprising a plurality of spaced apart first electrode lines and an associated TFT coupled to the first electrode lines; and
a second pixel electrode portion comprising a plurality of spaced apart second electrode lines, the second pixel electrode portion capacitively coupled with the first pixel electrode portion;

wherein an interval between adjacent first electrode lines of the first pixel electrode portion is different from an interval between adjacent second electrode lines of the second pixel electrode portion.

19. The liquid crystal display panel of claim 18, wherein an area of the first pixel electrode portion is different from an area of the second pixel electrode portion.

20. The liquid crystal display panel of claim 19, wherein the interval between adjacent first electrode lines is greater than the interval between adjacent second electrode lines, and wherein the area of the first pixel electrode portion is larger than the area of the second pixel electrode portion.

21. The liquid crystal display panel of claim 19, wherein the interval between adjacent second electrode lines is greater than the interval between adjacent first electrode lines, and wherein the area of the second pixel electrode portion is larger than the area of the first pixel electrode portion.

22. The liquid crystal display panel of claim 18, wherein a width of each of the first electrode lines of the first pixel electrode portion is different from a width of each of the second electrode lines of the second pixel electrode portion.

23. The liquid crystal display panel of claim 22, wherein the width of each of the first electrode lines is greater than the width of each of the second electrode lines, and wherein the area of the first pixel electrode portion is larger than the area of the second pixel electrode portion.

24. The liquid crystal display panel of claim 22, wherein the width of each of the second electrode lines is greater than the width of each of the first electrode lines, and wherein the area of the second pixel electrode portion is larger than the area of the first pixel electrode portion.

25. The liquid crystal display panel of claim 18, wherein the pixel further comprises a storage electrode having first and second storage electrode portions, wherein the first and second storage electrode portions form first and second storage capacitors respectively with the first and second pixel electrode portions.

26. The liquid crystal display panel of claim 25, wherein the first and second pixel electrode portions each comprise four domains and further wherein the four domains of the first pixel electrode portion are associated with the first storage electrode portion and the four domains of the second pixel electrode portion are associated with the second storage electrode portion.

27. The liquid crystal display panel of claim 25, wherein the electrode lines in each domain of the first and second pixel electrode portions extend in a direction inclined to the first direction, and wherein the direction of one domain is different from the direction of other domains.

28. The liquid crystal display panel of claim 18, wherein an edge of the first pixel electrode portion is spaced apart from an edge of the second pixel electrode portion along an axis which is parallel with the first direction.

29. The liquid crystal display panel of claim 18, wherein the TFT supplies an image data signal from the data line to the first and second pixel electrode portions in response to a scan signal supplied from the gate line.

\* \* \* \* \*